United States Patent [19]

Harakal et al.

[11] Patent Number: 5,028,366

[45] Date of Patent: Jul. 2, 1991

[54] WATER BASED MOLD RELEASE COMPOSITIONS FOR MAKING MOLDED POLYURETHANE FOAM

[75] Inventors: Mark E. Harakal, Coopersburg; George J. Wasilczyk, Allentown; Gary D. Andrew, Walnutport, all of Pa.; Zdizslaw Makus, Bad Wiesse, Fed. Rep. of Germany; Michael Scarpati, Woodhaven, Mich.

[73] Assignee: Air Products and Chemicals, Inc., Allentown, Pa.

[21] Appl. No.: 142,970

[22] Filed: Jan. 12, 1988

[51] Int. Cl.$^5$ .............................................. B28B 7/38
[52] U.S. Cl. ............................................ 264/51; 264/338
[58] Field of Search ................ 264/338, 51, DIG. 65; 427/133, 135; 106/38.2, 38.22, 38.25

[56] References Cited

U.S. PATENT DOCUMENTS

| | | | |
|---|---|---|---|
| 2,514,296 | 12/1947 | Small et al. | 252/33.3 |
| 3,413,390 | 8/1963 | Heiss | 264/54 |
| 3,423,503 | 1/1969 | York | 264/338 |
| 3,694,530 | 9/1972 | Wolfe | 264/48 |
| 3,848,037 | 11/1974 | Harper | 264/46.4 |
| 3,893,868 | 7/1975 | Klement et al. | 106/38.24 |
| 3,929,499 | 12/1975 | Thomas | 106/268 |
| 3,931,381 | 1/1976 | Lindberg | 264/45.5 |
| 3,959,242 | 5/1976 | Watts et al. | 526/9 |
| 3,968,302 | 7/1976 | Brown | 428/328 |
| 3,992,502 | 9/1976 | Krishnan | 264/129 |
| 4,028,120 | 6/1977 | Emond | 106/38.25 |
| 4,038,088 | 7/1977 | White et al. | 106/38.24 |
| 4,098,731 | 4/1978 | von Bonin et al. | 521/51 |
| 4,110,119 | 8/1978 | Boehmke et al. | 106/38.24 |
| 4,110,397 | 8/1978 | Wooler | 264/338 |
| 4,130,698 | 12/1978 | Sparrow et al. | 521/130 |
| 4,131,662 | 12/1978 | Cekoric | 264/51 |
| 4,172,870 | 10/1979 | Whitchurch | 264/51 |
| 4,184,880 | 1/1980 | Huber et al. | 106/15.05 |
| 4,308,063 | 12/1981 | Horiuchi et al. | 106/38.22 |
| 4,312,672 | 1/1982 | Blahak | 106/38.22 |
| 4,331,736 | 5/1982 | Schafer et al. | 428/425.6 |
| 4,396,623 | 8/1983 | Ball et al. | 428/326 |
| 4,427,803 | 1/1984 | Fukui et al. | 523/402 |
| 4,431,455 | 2/1984 | Brown et al. | 106/245 |
| 4,451,425 | 5/1984 | Meyer | 264/300 |
| 4,454,050 | 6/1984 | Bertell | 252/42 |
| 4,473,403 | 9/1984 | Wesala | 106/38.24 |
| 4,491,607 | 1/1985 | Wesala | 427/135 |
| 4,532,096 | 7/1985 | Bogner et al. | 264/109 |
| 4,534,928 | 8/1985 | Martin | 264/334 |
| 4,609,511 | 9/1986 | Fischer et al. | 264/51 |
| 4,770,827 | 9/1988 | Fischer | 264/51 |
| 4,783,296 | 11/1988 | Fischer et al. | 264/338 |

FOREIGN PATENT DOCUMENTS

| | | |
|---|---|---|
| 223233 | 5/1987 | European Pat. Off. . |
| 2805950 | 2/1978 | Fed. Rep. of Germany . |
| 2702930 | 7/1978 | Fed. Rep. of Germany ...... 264/338 |
| 2637919 | 8/1978 | Fed. Rep. of Germany . |
| 592606 | 2/1978 | U.S.S.R. ............................. 264/338 |
| 1043572 | 9/1966 | United Kingdom . |
| 1193882 | 2/1969 | United Kingdom . |

OTHER PUBLICATIONS

Bareco, Operating Group of Petrolite Corp., "External Mold Release Formulations".
Hoechst-Wachse, "Raw Materials for the Manufacture of Mould Release Agents".
Hüls Information, "Vestowax Mold Release Agents (Parking Agents)".

Primary Examiner—Mary Lynn Theisen
Attorney, Agent, or Firm—Michael Leach; James C. Simmons; William F. Marsh

[57] ABSTRACT

A method for preparing a polyurethane foam article in a mold by applying to a mold surface a water-based mold release composition which includes a release effective system which is in a solid (hardened) state at the mold pour temperature and a liquid state at the demold temperature, pouring a polyurethane foam composition into the mold, curing the foam composition and demolding the foam article. The use of such release effective system in the aqueous mold release composition provides for a reduction in surface defects of the polyurethane foam article.

Also disclosed is the incorporation of a poly(siloxane-glycol) surfactant having a cloud point ranging from 25°–50° C. into a water-based mold release composition including an aqueous emulsion or dispersion of at least one release effective substance and desirably at least one emulsifying agent provides for improved surface quality of the foam product.

14 Claims, No Drawings

WATER BASED MOLD RELEASE COMPOSITIONS FOR MAKING MOLDED POLYURETHANE FOAM

TECHNICAL FIELD

The present invention relates to release agents for making a polyurethane foam article in a mold.

BACKGROUND OF THE INVENTION

Molded flexible polyurethane foam parts such as automotive seating, arm rests, head rests and steering wheels are produced in molds that are precoated with a release agent prior to injection of the foam-forming components. The polyurethane foam processes are quite varied with regard to the foam-forming components which can be used and the equipment, molds and processing conditions used. The mold release agent affects both the release characteristics of the molded part as well as the surface quality of the part.

Conventional mold release compositions comprise release effective substances, such as waxes or silicones, dispersed in low boiling organic solvent carriers which control film thickness and film formation. The high solvent concentration of these compositions produces significant organic emissions during the time between the release agent application and pouring of the foam components. Increased public and regulatory agency awareness of and concern about organic emissions has led to significant impetus worldwide to reduce and eliminate organic solvents from mold release compositions.

Initial attempts at solving this problem have involved the replacement of organic solvents with non-volatile carriers such as water (U.S. Pat. Nos. 4,473,403 and 4,491,607). Compared to conventional solvent containing release materials, aqueous systems may require increased evaporation times and higher mold temperatures to remove water due to extensive hydrogen bonding. In addition to unfavorable evaporation rates, water with its high surface tension is a poor film-forming solvent resulting in poor integrity of the release film. Furthermore, the low equivalent weight of water and its small molecular size make it highly reactive to isocyanate. Water remaining in the mold release composition prior to pouring results in competitive reactions between the water/isocyanate and the polyol/isocyanate. This reaction of water with isocyanate results in carbon dioxide generation which leads to surface and subsurface defects in the foam product including bubbles, blisters, voids and, if severe enough, foam collapse.

Application of entirely aqueous systems tends to be difficult. Desirable light applications allow for reasonable evaporative rates, however, insufficient levels of release effective substances are delivered to the mold to prevent parts from sticking. Heavier applications provide for sufficient release qualities for the parts, but residual water trapped within the release film matrix results in severe surface deficiencies. Furthermore, some of these systems are prone to severe build-up over time.

Aqueous mold release systems have been developed to eliminate these long evaporation rates through the substitution of considerable portions of water with low boiling alcohols. However, the competing water/isocyanate reaction is not eliminated and the use of the solvents does not alleviate volatile organic emission concerns.

Other mold release systems have been developed based exclusively on water as the carrier as described in U.S. Pat. No. 4,609,511. This patent alleges that the water/isocyanate reaction is minimized by the masking of water molecules through the effect of "lyotropic mesomorphism". Such masking of water is achieved through the combined use of release effective substances, preferably microwaxes, thickened petrolatum fractions and polysiloxanes, and suitable auxiliary masking agents, for example, emulsifiers such as ethoxylated fatty alcohols.

These water-based release agents have found limited use in higher density methylene diphenyl diisocyanate (MDI) molded polyurethane applications such as head and arm rests. When these release agents are used in lower density applications such as automobile seating, release problems occur from build-up of release agent on the parts. In addition to release problems in lower density applications, surface and subsurface deficiencies are also observed particularly in more water sensitive toluene diisocyanate (TDI) formulations.

It has been discovered by the applicants that another cause of release problems and surface defects associated with the use of water-based mold release compositions is the physical break-down and removal of the release coating from that part of the mold upon which the foaming components impinge when charged or poured into the mold. The pouring physically erodes, or "washes off", the release coating, especially when the coating is liquid at the mold pour temperature. Surface/subsurface deficiencies in the molded foam part result.

SUMMARY OF THE INVENTION

In the preparation of a polyurethane foam product in a mold, the mold is typically at an elevated temperature when the polyurethane foam composition is charged, or poured, into the mold (mold pour temperatures). The mold is closed and usually heated in an oven. The heat of reaction of the foam composition also contributes to the rise in mold temperature. Upon removal from the oven the mold is opened (demold temperature) and the foam product demolded.

The present invention is directed to a method for preparing a polyurethane foam article in a mold by applying to the mold surface a waterbased mold release composition which comprises an aqueous emulsion or dispersion of a release effective system, pouring a polyurethane foam composition into the mold, curing the foam composition and demolding the foam article. According to the present invention the release effective system of the mold release composition consists essentially of a release effective substance or a combination of such substances and desirably at least one emulsifying agent such that the release effective system exhibits a melting point within the operating temperature range of the mold, i.e. the release effective system is in a solid state (hardened) at the mold pour temperature and a liquid state at the demold temperature. The use of such release effective system in the aqueous mold release composition advantageously provides for a reduction in surface and subsurface defects of the polyurethane foam article.

Water-based mold release compositions according to the invention address the previous limitations of the water based technology and offer a performance which is at least comparable to that of solvent-based compositions. These compositions allow immediate foam pouring after application of the mold release composition without the accompanying surface and subsurface defects associated with both earlier water-based and solvent-based technology. Good release efficiency is afforded in that the line operator need not spend an unacceptable amount of time in removing the foam product from the mold. Good surface/subsurface foam quality is obtained in that there are essentially no bubbles, blisters or voids.

DETAILED DESCRIPTION OF THE INVENTION

The water-based mold release compositions according to the invention are able to provide for good release of polyurethane foam parts from the mold without the accompanying surface and/or subsurface defects through the use, in one aspect, of a release effective system having a particular melting point and, in another aspect, of certain poly(siloxane-glycol) surfactants.

Good release properties are obtained by using release effective substances such as microcrystalline or paraffin waxes with melting points within the operating temperature range of the mold. (The general terms "wax" and "release effective substance" are used interchangeably). As the release effective system, a release effective substance, or a combination thereof, is chosen such that the release effective system has a melting point above the temperature of the mold at which the MDI or TDI polyurethane foam composition is added to the mold (mold pour temperature), preferably at least 5° C. above the mold pour temperature, and below the temperature of the mold when the foamed article is removed (demold temperature), preferably at least 5° C. below the demold temperature. In this manner, the water-based mold release composition is in a "liquid" state at demolding and the foam part is easily removed from the mold. In addition, the presence of a "solid" release effective substance on the mold surface at mold pour avoids "washing off" the release coating from the mold surface at the area of impact of the charged polyurethane formulation.

When two or more release effective substances compose the release effective system of the mold release composition, the combination usually does not exhibit the individual melting points of the components but, nevertheless, must be solid at the mold pour temperature and liquid at the demold temperature, i.e. the melting point of the combination of release effective substances must fall between the pour and the demold temperatures.

In the aqueous mold release composition the combined "solids" (including surfactants and emulsifiers) has a lower melting point than that of the individual waxes so that when the release composition is applied to a heated mold, it melts to form a continuous film. In this liquid state the components in the coating stratify with the surfactants and emulsifiers migrating toward the air/liquid interface and the waxes migrating toward the mold surface. Once the waxes are isolated by this migration, they attain their naturally higher melting point and solidify to form a solid layer on the mold surface. After the pouring of the liquid foam composition and closing the mold, the combined heating of the mold in the oven and the exotherm of the reacting foam composition serve to raise the mold temperature above the melting point of the waxes. When the mold is opened at demold, the waxes are in the liquid state and the part is easily removed. As the part is demolded, a certain percentage of the release composition layer is removed with the foam.

The release composition is a stable water/wax emulsion that does not rely upon the evaporation of water prior to polyurethane foam composition being poured onto the mold surface. In the present release composition water serves as part of the release mechanism by its incorporation into a matrix of the release effective system consisting essentially of release effective substances and emulsifying agents. The preferred release compositions are aqueous dispersions containing release effective substances, ionic and nonionic emulsifiers and other additives with the total water content of the composition being generally about 80 wt% or greater.

Suitable release effective substances are any of those waxes, microwaxes, thickened petrolatum fractions and polysiloxane release agents well known in the art. The release effective substances are typically microcrystalline or paraffin waxes with melting points between 43° and 71° C. (110° and 160° F.). Also effective are synthetic waxes such as glyceryl fatty acid esters and higher molecular weight polyethylene glycols. These high molecular weight esters of fatty acids typically contain 5-30 carbon atoms and can be used either in their unsaturated or hydrogenated forms, polyethylene glycols that have found utility in the present compositions have molecular weights from 4000 to 8000. Suitable release is obtained when the waxes are present in concentrations between 3-8 wt%, preferably about 6 wt%, based on the aqueous composition. Of course, it is required that the release effective substance or combination of substances utilized as the release effective system in an aqueous mold release composition for a particular mold must be "liquid" at demold temperature and "solid" at mold pour temperature.

The use of synthetic waxes such as hydrogenated glycerol tristearates contributes to the release of the polyurethane foam product. It is believed that these materials tend to bind up the water molecules as part of the wax/emulsifier matrix, thereby preventing adverse reactions with isocyanate molecules and leading to an improved surface in the foam. As a result of having minimal hydrogen bonding, the separation of water/wax layers would not be affected and good release is provided.

Suitable emulsifying agents are any of those known in the art for preparing aqueous emulsions of release-effective substances, particularly those with an HLB value of 8-15 and especially polyalkoxylated nonionic surfactants. In order to obtain efficient emulsification of the release effective substances in water, ionic emulsifiers are used in combination with the nonionic emulsifiers. This combination allows for an overall lower wax:emulsifier ratio than that used in other aqueous-based release agents.

The preferred emulsifying agents are the fatty alcohol ethoxylates such as the ethoxylate of lauryl alcohol having 3-4 ethoxy units. This fatty alcohol ethoxylate typically would have an HLB value between 10-13. Other useful emulsifying agents are fatty amines such as tallow amines comprising combinations of octadecyl and hexadecyl amine. In addition to fatty amines, fatty acids such as octadecyl acid can also be used.

Typically, no single emulsifying agent is sufficient to adequately emulsify the release effective substances in the aqueous composition. Rather it is a combination of emulsifying agents that provides for the most consistent dispersion. Fatty alcohol ethoxylates are typically used at between 0.5 and 4.5 wt%, preferably about 2.5 wt%, based on aqueous release composition. Fatty amines are used typically between 0.5 and 3 wt% and preferably between 1.25 and 1.5 wt%. The fatty acids serve as effective emulsifying agents and may be used in concentrations of about 0.25 to 0.75 wt%, but are most effective when used at about 0.25 wt%.

Further teaching with regard to suitable release effective substances and emulsifying agents can be found in U.S. 4,609,511 which is hereby incorporated by reference.

Good release is effected by minimizing the use of non-release components such as emulsifying agents and thickeners. By lowering the level of total emulsifiers, primarily those emulsifiers having a high affinity for hydrogen bonding with water, such as the ethoxylated fatty alcohols, the water remains in a more mobile state and will readily release as part of the wax layer.

The additional additives that can be included in the water-based mold release compositions can be divided into three categories: (1) materials used to aid the production of the release composition, (2) film forming aids and (3) surface modification additives to improve the surface/subsurface of the molded foam product.

Production aid additives such as solution defoamers can be used to reduce air entrainment as a result of vortex agitation. Particularly effective as the air de-entrainment aids are ethoxylated acetylenics such as Surfynol ® surfactants, especially Surfynol 465 surfactant. These additives work well when used in concentrations ranging from 0.25 to 1.5 wt%, preferably about 0.5 wt%. in addition to acting as defoamers, the ethoxylated acetylenics assist in wetting out the release agent.

Solvents such as aliphatic hydrocarbons, including mineral or naphthyl spirits, work particularly well as film forming additives. The flash point of these solvents can be about 10-43° C. (50-100° F) with a preferred flash point slightly below that of the melting point of the release effective substance. The additives when used at about 1-4 wt%, preferably about 2%, serve to assist in film formation of the dispersed release effective substances on the molds. In addition to aiding in film formation, aliphatic hydrocarbon solvents assist in solubilizing the initial water-in-oil emulsion.

Poly(siloxane-glycol) surfactants are effective surface modification additives. The poly(siloxane-glycol) surfactants suitably used are those possessing a cloud point ranging from 25 to 50° C, preferably 30-40° C. and most desirably from 30° to 37° C. The preferred surfactants can be represented by the following formula:

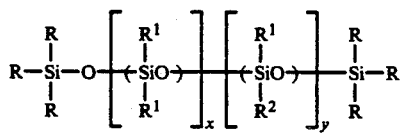

where R and R$^1$ are the same or different and represent a C$_1$C$_5$ alkyl or an aryl radical, preferably a methyl radical, R$^2$ represents -(CH$_2$)$_l$O(C$_2$H$_4$O)$_m$(C$_3$H$_6$O)$_n$-R$^3$
with
l = 1-10, preferably 3,
m = 5-50,
n = 5-50, and
m:n ranging from 4:1 to 1:4, preferably about 1:1,
R$^3$ being a typical organic capping moiety such as —H, —Ac, —R, dodecenyl anhydride and the like,
x represents an integer ranging from 30-150, and
y represents an integer ranging from 1-40, and
x:y ranges from 3:1 to 20:1

Other suitable poly(siloxane-glycol) surfactants are those generally considered hydrolyzable by the nature of the silicon-oxygen-carbon bonds. These surfactants are commercially available and can be represented by the following structure:

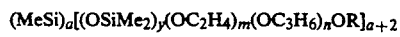

where a is a number from 0.5 to 2 and R, m, n and y are the same as above.

These surfactants are effective in the aqueous mold release composition when they have a cloud point in the specified range. (See for example surfactant L-6202 in Table I).

The cloud point of a nonionic surfactant is that temperature of a 1% aqueous solution above which the surfactant separates into a second phase. Below the cloud point the surfactant is dissolved in water in a molecular dispersion existing in micelles.

The use of a poly(siloxane-glycol) surfactant with a cloud point above about 50° C. results in surface performance drop off, i.e., an increase in surface blistering and subsurface voids because the surfactant is less soluble in the hydrophilic portion of the mold release composition. A poly(siloxane-glycol) surfactant with a cloud point below about 25° C. is too hydrophobic to form the requisite surface barrier.

These poly(siloxane-glycols) are used in amounts ranging from 0.5 to 15 wt%. preferably about 2-6 wt% in the aqueous mold release composition. When these surfactants are used at higher concentration, a more closed surface foam may be observed. To alleviate this condition, other hydrophobic polysiloxanes of lower molecular weight may be used in combination with the poly(siloxane-glycol) surfactant to improve the openness of the foam surface.

It is believed that the poly(siloxane-glycol) materials serve as a barrier layer on top of the release effective substances and prevent water in the release composition from reacting with isocyanate in the developing foam. This barrier mechanism permits the release of a foam part without surface/subsurface deficiencies that would result from water/isocyanate reactions.

The poly(siloxane-glycol) surfactant used in the mold release composition is selected to have the proper number of hydrophilic pendants to allow for dispersion within the aqueous medium. The backbone of the polymer is of a sufficient length and silicone content to impart a strong hydrophobic character so that, upon application of the mold release composition to the mold, the siloxane-glycol copolymer immediately begins to migrate and align along the air-release agent interface. When the liquid foam composition is applied to the surface, the isocyanate is shielded from the water present in the release composition.

The siloxane-glycol copolymer is believed to be present in a gradient with the highest concentration along the air/surface interface with diminishing concentrations toward the mold surface. When the foam product is removed from the mold, layers of release effective substance/ water emulsion accompany it. The copolymer surfactant in underlying layers then migrates to the newly formed interface to allow for the formation of a new barrier layer.

The water based mold release compositions in the following Examples were prepared by charging the organic materials to a vessel followed by heating to 93° C. under 7 psi pressure on the vessel. After mixing the organic materials for 15 minutes at high agitation, hot water was charged to the vessel insuring that the temperature of the vessel contents stayed at least 5–10° C. above the melt point of the hot organic materials mixture. While under high agitation, the temperature of the contents was reduced to 5–10° C. above the melting point of the hot organic materials mixture and water at ambient temperature was rapidly charged to drive the temperature of the contents through the melt point range to yield an emulsion of solids in water. When the composition was cooled to about 35° C., the poly(siloxane-glycol) surfactant was added.

Typically in the art, commercial molds are pretreated with solvent-based or paste wax prior to application of the mold release composition.

EXAMPLE 1

In this example various poly(siloxane-glycol) surfactants which are used commercially as cell stabilizers in polyurethane foam compositions were added to the following water-based mold release composition:

| | |
|---|---|
| National wax 160/65 | 3.3 |
| Alkoxylated triglyceride wax | 2.2 |
| Zylac 301 wax | 1.1 |
| Fatty alcohol polyglycol ether (10 EO) | 2.7 |
| Octadecylamine | 1.4 |
| Oleic acid | 0.3 |
| Spec. Naphtholite | 2.2 |
| Water | 87 |
| | ~100 |
| Poly(siloxane-glycol) | See Table I |

Each mold release composition was evaluated in the production of a polyurethane foam article in a mold under the following mold operating temperatures:

| | | |
|---|---|---|
| application of release composition | 150–155° F. | (65–68° C.) |
| foam composition pour | 130–135° F. | (54–57° C.) |
| oven | 175–180° F. | (79–82° C.) |
| demold | 160–165° F. | (71–74° C.) |

The polyurethane foam composition was the following:

| | |
|---|---|
| Voranol 4702[a] | 80 |
| Multranol E9151[b] | 40 |
| DC 5043 cell stabilizer | 1.5 |
| Diethanolamine | 1.5 |
| Water | 4 |
| Dabco ® T-125[c] Catalyst | 0.007 |
| Dabco ® BL-11 | 0.15 |
| Dabco 33-LV ® | 0.5 |
| Dabco BL-17 | 0.1 |
| TDI 80 | 102 Index |

[a]Trifunctional polyether polyol (4800 mol. wt.) from Dow Chemical
[b]Polyether polyol from Mobay Chemical
[c]Dabco catalysts from Air Products and Chemicals, Inc.

Table I sets forth the various poly(siloxane-glycol) surfactants that were tested and the resulting release performance and product surface (includes subsurface) evaluation. The surfactants were added at levels of 3, 5 and 7 wt%.

A foam with a "good/good" release/surface rating is considered as a commercially acceptable foam. A "good" release is identified by an operator being able to remove the foam part from the open mold with a minimal effort. A "good" surface is one described as having minimal blistering, skinning and voiding.

TABLE I

| RUN | SURFACTANT | CLOUD PT. | x:y | PERFORMANCE RELEASE/SURFACE 3% | 5% | 7% |
|---|---|---|---|---|---|---|
| 1 | DC 5039 | 35 | 5:1 | Very Good/Very Good | Very Good/Very Good | Very Good/Very Good |
| 2 | L-540 | 30.5 | 14:1 | Good/Good | Very Good/Good | Good/Good |
| 3 | L-560 | 30.5 | 14:1 | Poor/Poor | Good/Good | Poor/Poor |
| 4 | DC-190 | 36.5 | 12:1 | Good/Good | Good/Good | Good/Good |
| 5 | DC-198 | 35 | 10:1 | Good/Poor | Good/Good | Poor/Good |
| 6 | DC-5043 | NS* | 15:1 | Poor/Very Poor | Poor/Very Poor | Poor/Very Poor |
| 7 | DC-197 | 53 | 2:1 | Good/Very Poor | Very Poor/Very Poor | Very Poor/Very Poor |
| 8 | DC-193 | 79 | 3:1 | Poor/Very Poor | Poor/Very Poor | Poor/Very Poor |
| 9 | L-6202 | 33.5 | — | Very Poor/Poor | Very Good/Good | Good/Very Good |

*Not soluble - essentially equivalent to a cloud point at 21° C.
DC surfactants are marketed by Dow Corning Corp.
L surfactants are marketed by Union Carbide Corp.

It can be seen from the data in Table I that those poly(siloxaneglycol) surfactants having a cloud point outside the 25°–50° C. range did not provide for commercially acceptable release performance and foam product surface quality.

EXAMPLE 2

In this Example various waxes having different melting points were incorporated into the following water-based mold release composition to which was added 4% L-540 poly(siloxane-glycol):

| | pbw | wt % |
|---|---|---|
| wax (see Table II) | 48 | 6 |
| oleic acid | 2 | 0.25 |

-continued

|  | pbw | wt % |
|---|---|---|
| octadecylamine | 10 | 1.25 |
| fatty alcohol polyglycol ether (10 EO) | 12 | 1.5 |
| naphthol spirits | 32 | 4 |
| water | 700 | 87 |

Each mold release composition was evaluated as described in Example 1 for the production of a polyurethane foam article.

Table II presents the information regarding the various waxes that were used and the performance regarding release efficiency and product surface quality.

TABLE II

| RUN | WAX (mp °C.) | PHYSICAL STATE POUR/DEMOLD | PERFORMANCE RELEASE/SURFACE |
|---|---|---|---|
| 10 | LOOBWAX 0605 (72°)$^a$ | solid/liquid | excellent/good |
| 11 | National wax 160/65 (71–74°)$^b$ | solid/liquid | good/good |
| 12 | National wax 160/65 (162°) Zylac 301 (74–77°)$^c$; 1:1 wt ratio | solid/liquid | good/good |
| 13 | National wax 160/65 (162°) X-2018 (71–74°)$^d$; 1:1 wt ratio | solid/liquid | good/good |
| 14 | VYBAR 260 (46–49°)$^e$ | liquid/liquid | good/poor |
| 15 | Zylac 301 (74–77°) | solid/solid | very poor/good |
| 16 | WS215 (49°)$^f$ | liquid/liquid | excellent/very poor |

$^a$Microcrystalline wax from Dura Chem
$^b$paraffin wax from National Wax
$^c$Ethylene/propylene copolymer wax from Petrolite
$^d$Ethylene/propylene copolymer wax from Petrolite
$^e$Ethylene/propylene copolymer wax from Petrolite
$^f$Alkoxylated triglyceride (10,000 mol wt) from Dura Chem It can be seen from Table II that the mold release compositions that had a release effective system that was solid at the mold pour temperature and liquid at the demold temperature afforded good release performance and a foam product with good surface/subsurface properties. Those compositions in which the release effective system was liquid or solid at both pour and demold resulted in poor surface/subsurface quality and poor release performance, respectively.

EXAMPLE 3

In this Example the water-based mold release compositions described in Table III (components in wt%) were evaluated for performance in release efficiency and product surface/subsurface quality as in Example 2 with the resulting information set forth in Table IV.

TABLE III

|  | 17 | 18 | 19 | 20 | 21 | 22 |
|---|---|---|---|---|---|---|
| National Wax 160/65 (160°) | 3.3 | 5.3 | 3.8 | — | — | — |
| Water sol wax (120°) | 2.2 | 3.4 | 2.6 | 6.5 | 3.3 | — |
| Zylac 301 wax (175°) | 1.1 | 1.9 | — | — | — | 10.8 |
| Vybar 260 (127) | — | — | — | — | 3.3 | — |
| Fatty alcohol polyglycol ether (10 EO) | 2.7 | 4.1 | 2.6 | — | 2.7 | 4.1 |
| Octadecylamine | 1.4 | 2.5 | 1.4 | — | 1.4 | 2.6 |
| Oleic acid | 0.3 | 0.5 | 0.3 | — | 0.3 | 0.5 |
| Spec. Naphtholite | 2.2 | — | 2.1 | — | 2.2 | — |
| Hot water | — | 17.9 | 20.3 | — | — | 26.6 |
| Ambient water | 87 | 64.4 | 66.5 | 93.5 | 87 | 55.4 |
| L-540 poly(siloxane-glycol) | 4 | 4 | 4 | 4 | 4 | 4 |

TABLE IV

| RUN | PHYSICAL STATE POUR/DEMOLD | PERFORMANCE RELEASE/SURFACE |
|---|---|---|
| 17 | solid/liquid | very good/very good |
| 18 | solid/liquid | very good/very good |
| 19 | liquid/liquid | good/poor |
| 20 | liquid/liquid | very good/poor |
| 21 | solid/liquid | excellent/very good |
| 22 | solid/solid | poor/poor |

The data shows that all the mold release compositions which contained a release effective system that was liquid at demold and gave good release performance. However, only those compositions with a release effective system that was also solid at pour gave good surface/subsurface results.

STATE OF INDUSTRIAL APPLICATION

The present invention is useful in the preparation of polyurethane foam articles in a mold.

We claim:

1. In a method for preparing a polyurethane foam product in a mold by applying to the mold surface a mold release composition comprising an aqueous emulsion or dispersion having a release effective component, pouring a polyurethane foam composition into the mold, curing the foam composition and demolding the foam product, the improvement which comprises applying an aqueous mold release composition having a release effective component which is solid at the mold pour temperature and liquid at the demold temperature.

2. The method of claim 1 in which the release effective component is solid at about 5° C. above the mold pour temperature.

3. The method of claim 1 in which the release effective component is liquid at about 5° C. below the demold temperature.

4. In a method for preparing an MDI or TDI polyurethane foam product in a heated mold by applying to the mold surface an aqueous mold release composition containing a release effective system, pouring an MDI or TDI polyurethane foam composition into the mold, curing the foam composition and demolding the foam product, the improvement which comprises applying an aqueous mold release composition having a release effective system which is solid at the mold pour temperature and liquid at the demold temperature.

5. The method of claim 4 in which the mold pour temperature is about 130° F.

6. The method of claim 4 which the demold temperature is about 160°–165° F.

United States Patent Office

PTO - BOYERS, PA Duty Station

MISSING PAGE TEMPORARY NOTICE

PATENT # 5028366     FOR ISSUE DATE 7-2-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 11 to end

Data Conversion Operation
Boyers, Pa